Figure 1:
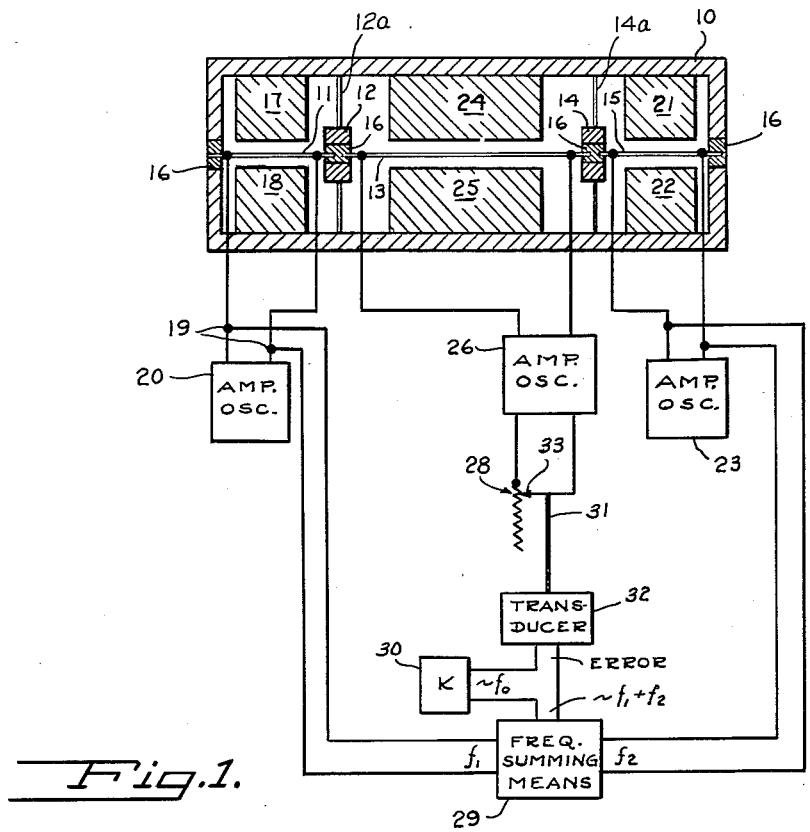

INVENTOR.
MURRAY TRACHTENBERG

United States Patent Office 3,122,024
Patented Feb. 25, 1964

3,122,024
FORCE RESPONSIVE VIBRATING FILAMENTS
Murray S. Trachtenberg, New York, N.Y., assignor to American Bosch Arma Corporation, a corporation of New York
Filed June 21, 1957, Ser. No. 667,102
2 Claims. (Cl. 73—517)

The present invention relates to force control means, and has particular reference to such means employing vibration elements therein.

In vibrating wire accelerometers of the type disclosed in copending U.S. patent application Serial Number 586,615, filed May 22, 1956, it has been found profitable to continuously monitor and control the initial tension of the vibrating wires for the purposes explained in copending U.S. patent application Serial Number 611,042, filed September 20, 1956, both of these patent applications being assigned to the assignee of the present invention. The latter application describes several conventional tension control devices, but the device of this invention is particularly advantageous in the vibrating wire accelerometer. However, its use is not limited to the vibrating wire accelerometer alone, but it may be employed wherever force control of this type is required.

The invention contemplates use of a filamentary element stretched between a pair of points, between which it is desired to control the applied force. The filamentary element is caused to vibrate at its natural frequency, and the amplitude of the vibration is regulated according to the strength of an electric signal.

As the amplitude of the vibration changes, the length of the envelope changes by virtue of the fact that the terminal points of this vibrating element have dynamic characteristics which prevent them from following the instantaneous motion of the vibrating element, while they do follow the changes in envelope size. This action tends to create a change in the distance between the ends of the vibrating element, with a consequent change in the tension in the mechanism connected thereto.

In a vibrating wire accelerometer having a pair of sensitive masses, the vibrating control element is connected between the sensitive masses. The control element is located in a transverse magnetic field, and the signal output of an electronic amplifier is connected across the ends thereof. The amplifier is energized by a signal of variable strength having a frequency substantially equal to the natural frequency of the filamentary element, and in accordance with the laws of nature, the filamentary element is caused to vibrate in the magnetic field, the amplitude of the vibration being dependent upon the strength of the signal output of the amplifier.

When applied to the vibrating wire accelerometer of the type disclosed in the above identified U.S. patent application, the sum of the frequencies of the vibrating wires of the accelerometer proper may be maintained at a constant value by adjusting the current input to the vibrating element in accordance with the deviation of the sum frequency from the desired constant value.

Figure 2:
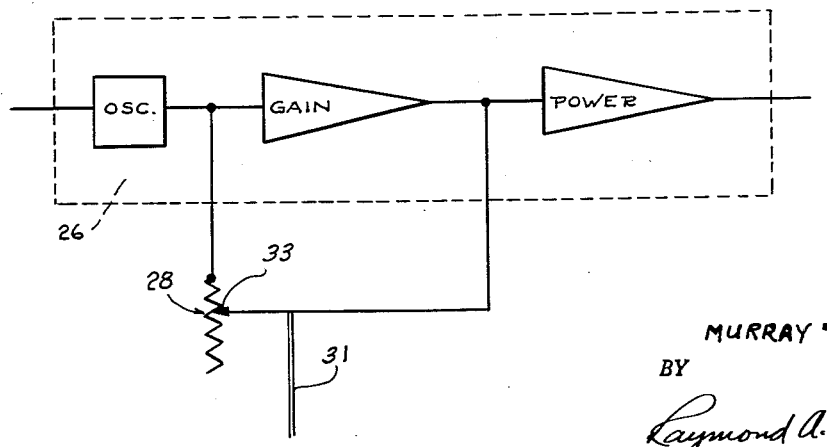

For a more complete understanding of the invention, reference may be had to the accompanying diagrams in which FIGURE 1 is a schematic wiring diagram of the essentials of a vibrating wire accelerometer with the tension control of the present invention; and FIGURE 2 is a schematic detail of a portion of FIG. 1.

With reference first to FIGURE 1 of the drawings there is shown the frame 10 of a vibrating wire accelerometer of the type disclosed in U.S. patent application Serial Number 586,615, filed May 22, 1956 for Accelerometer and assigned to the assignee of this application. Stretched across the ends of the frame 10, in axial alignment with each other and in sequential order are a first sensing vibrating wire 11, a first weight 12, the force control vibrating element 13, a second weight 14 and a second sensing vibrating wire 15. Suitable insulating inserts 16 are provided in the frame 10 and weights 12 and 14 to effect electrical isolation of each of the vibrating wires 11, 13, and 15. Other means may be employed to provide the electrical isolation if more convenient. The weights 12 and 14 may be additionally supported by the radial members 12a and 14a respectively which are equally spaced about the weights 12 and 14 and are connected between the weights 12 and 14 and the accelerometer frame 10. The radial members prevent transverse displacement of the weights, but do not introduce appreciable resistance to their motion longitudinally of the wires 11 and 15. The wire 11 is located in the transverse magnetic field of a pair of magnets 17, 18 and is connected electrically across the terminals 19 of an electronic oscillator 20.

The output of the oscillator provides current to the wire 11 to produce vibration of the wire in the magnetic field at a frequency equal to the frequency of the amplifier oscillator 20 output, and the signal induced in the wire 11 as a result of its motion in the magnetic field provides the signal to maintain the wire in vibration. This action is well known in the art and forms no part of the invention, per se.

The second sensing wire 15 is also located in a transverse magnetic field, supplied by the magnets 21, 22, and is kept in vibration by the electronic amplifier oscillator 23 in a similar manner. As explained in the patent applications above referred to, the faces of the magnets 17, 18, and 21, 22 are preferably oriented in a manner such that the vibrations of wires 11 and 15 take place in perpendicular planes in order to minimize the coupling between the two sensing wires.

The frequency of vibration of the sensing wires 11 and 15 is dependent upon the tension in the wires 11, 15. When the frame 10 is not undergoing acceleration, the tensions are equal and the vibration frequencies are also equal. Under acceleration, in the direction of the axis of wires 11, 15 an additional force is applied to weights 12 and 14 such as to increase the tension in one wire 11 or 15, and decrease the tension in the other wire 15 or 11, with a corresponding change in the frequency of vibration.

As described in patent application Serial Number 611,042, filed September 20, 1956, the difference between the vibration frequencies of the wires 11 and 15 is proportional to the acceleration, providing the sum frequency is kept at a constant value by constant monitoring of the initial tension of the wires 11 and 15.

To this end, a pair of magnets 24, 25 provide a magnetic field transversely of the wire 13. The terminals of an amplifier oscillator 26, similar to the amplifier oscillators 20, 23 are connected to the ends of the wire 13. Thus, in a manner similar to that whereby the wires 11 and 15 are maintained in oscillation at their natural frequencies, the wire 13 is vibrated at its natural frequency. Thus, the motion of the wire in the magnetic field provides an electrical signal to the oscillator portion of the amplifier 26 and the amplified output thereof provides a current to the wire 13 to keep it in motion.

The amplitude of the vibration of the wire 13 is, inter alia, proportional to the magnitude of the current therethrough, whence the amplitude is dependent upon the strength of the signal output of the amplifier 26. The vibration frequency of the string 15 is chosen to be so high that the masses or weight 12, 14 cannot follow the instantaneous position of the wire 13, whence the difference between the ends of the vibrating wire 13 or between the weights 12 and 14 is dependent upon the amplitude of the vibration of wire 13. Thus, the tension in the wires 11 and 15 can be controlled by the amplitude of vibration of wire 13 or by the output of the amplifier 26.

Now, in order to maintain the sum frequency at a constant value, the outputs of the oscillators 20 and 23, having frequencies $F1$ and $F2$ respectively are combined in a summing device 29 whose output is a signal proportional, in magnitude, to the sum $F1+F2$ and of any convenient frequency. The signal output of the summing device 29 is compared with a constant voltage 30 of appropriate frequency, having a magnitude proportional to the desired sum frequency. The resulting error voltage, proportional in magnitude to the deviation of the actual sum frequency from the desired sum frequency is used to control the output of the amplifier 26. In the particular embodiment of FIGURE 1, the error signal is transformed into a mechanical displacement of shaft 31 in a transducer 32, such as employed generally in analog computers for similar purposes. Shaft 31 drives the movable contact 33 of variable resistor or potentiometer 28 to adjust the signal output of the amplifier 26 by varying its gain. The resistor 28 is conveniently located in the feedback circuit of the gain control section of the amplifier as schematically illustrated in FIGURE 2. It should be realized, however, that the method of gain control is largely a matter of choice, and any means within the art, responsive to the strength of the control signal, may be employed for this purpose without departing from the spirit of the invention.

If at zero acceleration, the sum frequency $F1+F2$ is equal to some desired value $F0$, then for any acceleration other than zero, the sum $F1+F2$ is less than $F0$, provided the initial wire tension is not adjusted. The wires 11 and 15, must be tightened whenever the acceleration is other than zero in order to increase the sum $F1+F2$ to the desired total $F0$. Thus, the signal delivered by the amplifier 26 is a minimum when the acceleration is zero, and increases with acceleration in either direction.

There are certain design considerations which should be observed for optimum operation of the device. It has been found that the wires 11 and 15 should be made to vibrate in perpendicular planes to eliminate any mechanical coupling between the wires which might lead to error. Similarly, the wire 13 preferably vibrates in a plane other than the plane or vibration of either wire 11 or 15, e.g. a plane equally displaced from both the planes of vibration of wires 11 and 15. The plane of vibration of any wire 11, 13 or 15 is determined by the orientation of the magnetic field in which the vibration occurs, and can be controlled by suitable orientation of the magnets 17, 18; 24, 25 and/or 21, 22 respectively.

Additionally, although the natural frequencies of wires 11 and 15 may be the same, the natural frequency of the wire 13 is preferably different, either greater or less, and not a harmonic of the natural frequency of the wires 11 and 15.

Also, as explained in the patent applications earlier referred to, the socalled wires 11, 13 and 15 need not be of circular cross-section. In fact, the vibrating members 11, 13 and 15 are preferably ribbons rather than wires in order to further minimize the cross-coupling effects between the vibrating members.

It is conceivable that the amplitude of the vibration of the controlling wire 13 may be regulated by means other than those described. For example, the strength of the magnetic field of the magnets 24, 25 may be varied by constructing the magnets as electromagnets and controlling the energizing current. With constant energization of the wire 13 by the amplifier 26, the amplitude of the vibration is then dependent upon the electromagnet energization. Alternatively, the spacing between magnets 24 and 25 may be varied to control the strength of the magnetic field.

I claim:

1. In a device of the character described, a support, a pair of spaced members carried by said support, a filamentary element connected between said members, tension means connected to said spaced members and to said support, means for vibrating said tension means at their natural frequency, means for comparing the sum of the natural frequencies of said tension means with a predetermined value, means for vibrating said filamentary element at its natural frequency, and means for controlling the amplitude of the vibration of said filamentary element according to the difference between said sum of the natural frequencies and said predetermined value.

2. In a device of the character described, a support, a pair of spaced members carried by said support, a filamentary element connected between said members, tension means connected to said spaced members and to said support, means for vibrating said tension means at their natural frequency, means for comparing the sum of the natural frequencies of said tensison means with a predetermined value, means for vibrating said filamentary element at its natural frequency, and means for controlling the amplitude of the vibration of said filamentary element according to the difference between said sum of the natural frequencies and said predetermined value, said means for vibrating said filamentary element comprising means for providing a magnetic field transversely of said element and electronic amplifier oscillator means connected across said filamentary element.

References Cited in the file of this patent

UNITED STATES PATENTS

| | | |
|---|---|---|
| 2,479,563 | Terrill | Aug. 23, 1949 |
| 2,725,492 | Allan | Nov. 29, 1955 |

FOREIGN PATENTS

| | | |
|---|---|---|
| 729,894 | Germany | Dec. 19, 1942 |